United States Patent
Hashida et al.

(10) Patent No.: US 7,206,660 B2
(45) Date of Patent: *Apr. 17, 2007

(54) NAVIGATION APPARATUS AND METHOD, AND COMPUTER PROGRAM PRODUCT

(75) Inventors: Masaya Hashida, Saitama (JP); Makoto Hijikata, Saitama (JP)

(73) Assignee: Pioneer Corporation, Tokyo (JP)

( * ) Notice: Subject to any disclaimer, the term of this patent is extended or adjusted under 35 U.S.C. 154(b) by 201 days.

This patent is subject to a terminal disclaimer.

(21) Appl. No.: 10/738,093

(22) Filed: Dec. 18, 2003

(65) Prior Publication Data

US 2004/0133343 A1 Jul. 8, 2004

(30) Foreign Application Priority Data

Dec. 19, 2002 (JP) ............................. 2002-368775

(51) Int. Cl.
*G01C 21/32* (2006.01)
(52) U.S. Cl. ...................... 700/208; 700/200; 700/209; 700/210; 340/990; 340/995.18
(58) Field of Classification Search ................ 701/200, 701/208, 210, 211; 340/995.18, 990, 995.14
See application file for complete search history.

(56) References Cited

U.S. PATENT DOCUMENTS

| | | | |
|---|---|---|---|
| 4,891,760 A * | 1/1990 | Kashiwazaki et al. ...... | 701/200 |
| 6,230,098 B1 * | 5/2001 | Ando et al. ................. | 701/208 |
| 6,453,233 B1 * | 9/2002 | Kato .......................... | 701/208 |
| 6,546,332 B2 * | 4/2003 | Matsuo ....................... | 701/200 |
| 6,549,847 B2 * | 4/2003 | Ikeuchi et al. .............. | 701/208 |
| 6,738,710 B2 * | 5/2004 | Nagaki ....................... | 701/208 |
| 6,832,154 B2 * | 12/2004 | Nagaki et al. .............. | 701/208 |
| 2004/0088110 A1 * | 5/2004 | Suzuki ....................... | 701/211 |

FOREIGN PATENT DOCUMENTS

JP 2001-229369 A 8/2001

* cited by examiner

*Primary Examiner*—Thomas Black
*Assistant Examiner*—Marie A Weiskopf
(74) *Attorney, Agent, or Firm*—Sughrue Mion, PLLC

(57) ABSTRACT

A navigation apparatus is provided with: a first storing device for storing original data for a navigation based on a predetermined format and including map data, in such a manner that an empty area exists on the predetermined format in each processing unit for a predetermined kind of navigation processing; a second storing device for storing difference update data representing a data portion for the navigation that is updated with respect to the original data as a standard; and a re-writing device for generating updated data based on the format and including the original data and merge data, by re-writing the merge data at least partially into the empty area corresponding to the merge data. The merge data defines a relationship of the difference update data with respect to the original data. The navigation apparatus is also provided with a processing device performing the navigation processing on the basis of the original data and the difference update data.

21 Claims, 9 Drawing Sheets

NAVIGATION APPARATUS AND METHOD, AND COMPUTER PROGRAM PRODUCT

BACKGROUND OF THE INVENTION

1. Field of the Invention

The present invention relates to a navigation apparatus and method, such as an on-vehicle type navigation apparatus, and further relates to a computer program product for the navigation apparatus and/or method. More specifically, the present invention relates to a navigation apparatus and method improved in handling of map data used for a navigation processing, and further relates to a computer program product for performing the navigation processing.

2. Description of the Related Art

Navigation apparatuses, particularly on-vehicle type navigation apparatuses, are now becoming increasingly common under rapid-paced development. A navigation apparatus displays a current position of a navigation object, for example a current position of a car on which the navigation apparatus is mounted, on a display device, such as a display screen, and provides various functions including route guidance and the like, by means of map data stored in a CD-ROM or DVD-ROM. With regard to a way of obtaining the current position of the object, typically used is either one or both of (i) a stand-alone type (i.e., a built-in, self-sustained or dead-recognizing type) navigation system in which the current position of the object is measured only using information from sensors that are mounted on the navigation object to detect various parameters such as velocity, azimuth and the like and (ii) a navigation system with a navigation aid system using a GPS (Global Positioning System) in which the current position is obtained by receiving measurement data transmitted from a plurality of satellites.

On the other hand, a KIWI-format is proposed as a common format of map data used for the navigation apparatus, particularly the on-vehicle type navigation apparatus. This KIWI-format is proposed by navigation makers at home and abroad so as to provide map data independently of application software. That is, the format is constructed so as to be applied to various kinds of navigation apparatus, regarding versatility and extensibility. The KIWI-format or other format having the same idea as the KIWI-format is in widespread use among the map data used for the navigation apparatus.

On the other hand, there is proposed a technique to use map data in which the latest road data is reflected by updating the map data with difference data (e.g., as disclosed in Japanese Patent Application Laid-Open No. 2001-229369). Herein the "difference data" in the map data means a part of data (map data portion) different between a state of map data before updating and another state of map data after updating. In this technique, a state of map data that is generated at a predetermined time point is assumed to be original data, while difference data representing a change in real road conditions from the time point at which the original data is generated is independently generated. In the case that the map data is actually used, the change in the road conditions represented by the difference data is reflected into the original data. It is considered that the map data reflecting the latest road conditions can be obtained and utilized relatively efficiently by using the difference data.

Nevertheless, the difference data at present has such a data structure that it enforces, on the navigation apparatus, searching the entire difference data for appropriate difference data with respect to of the original data, and thereby using only the searched difference data. Thereby, a heavy task is imposed on the navigation apparatus to reflect the difference data, causing a technical problem of reduction in a processing speed of the navigation apparatus as a whole, or another problem of requiring an expensive processing device for a higher-speed processing.

Additionally, merging a form of data with the original data to reflect the difference data as mentioned above may cause a deviation in size, format or arrangement of data in the KIWI-format or the like. Therefore, technical problems arise, including a problem that the navigation apparatus reduces its processing speed, and a problem that the navigation apparatus fails completely or partly to recognize, as normal map data, the map data with a deviation or disorder due to the reflection of the difference data.

SUMMARY OF THE INVENTION

The present invention has been accomplished in view of the above problems, for example. It is therefore an object of the present invention to provide a navigation apparatus and method by which a retrieval or searching of difference data is performed efficiently, and a navigation processing is performed properly even if the retrieved difference data is reflected into the original map data, and further to provide a computer program product to serve a computer as such a navigation apparatus.

The above object of the present invention can be achieved by a navigation apparatus comprising: a first storing device for storing original data for a navigation based on a predetermined format and including map data, in such a manner that an empty area exists on the predetermined format in each processing unit for a predetermined kind of navigation processing; a second storing device for storing difference update data representing a data portion for the navigation that is updated with respect to the original data as a standard; a re-writing device for generating updated data based on the format and including the original data and merge data, by re-writing the merge data at least partially into the empty area corresponding to the merge data, the merge data defining a relationship of the difference update data stored in the second storing device with respect to the original data stored in the first storing device for the each processing unit; and a processing device for (i) making access, for the each processing unit, to the original data and the merge data in the updated data, and (ii) if the accessed data is the merge data, then also making access to the difference update data, the relationship of which is defined by the merge data and which is stored in the second storing device, and (iii) performing the navigation processing on the basis of the accessed original data and the accessed difference update data.

According to the navigation apparatus of the present invention, during operation, the current position of the object is obtained from latitude and longitude of the navigation object, which are calculated, from the GPS or the like. Additionally or alternatively, for instance, the current position of the object may be obtained from a direction, velocity or acceleration of the object, which are obtained from an angular velocity sensor, velocity sensor or acceleration sensor, respectively. The current position of the object obtained as such is associated or correlated with the map data or the like stored in the first storing device to thereby indicate the current position of the object on a map. Herein the first storing device may be a read-only optical information record medium such as a CD-ROM or a DVD-ROM, a re-writable optical information record medium such as a CD-RAM, a DVD-RAM or a DVD-RW, or a magnetic information record medium such as a hard disk. On the other hand, the map data may be stored in accordance with a predetermined format such as the KIWI-format. A route searching device such as a microcomputer may be further used to perform a route searching for indicating a route from a point on the map to another point on the map. Furthermore, by reflecting the contents of the difference data stored in the second storing device, which indicates or represents an update condition of the original data, it is possible to perform the navigation processing based on the latest map data. Herein, the second storing device may be a read-only optical information record medium such as a CD-ROM or a DVD-ROM, a re-writable optical information record medium such as a CD-RAM, a DVD-RAM or a DVD-RW, a magnetic information record medium such as a hard disk, a semiconductor memory such as a DRAM, or a removal information record medium such as a memory card, a memory stick or an IC card.

Particularly in this navigation apparatus, in the original data stored in the first storing device, an empty area exists, on the predetermined format, for each processing unit (e.g., each node unit, or each link unit) for the navigation processing such as route searching. The updated data includes the original data with the merge data that is recorded into such an empty area, and is on the basis of the predetermined format as the standard. More specifically, the merge data is for defining a relationship between the original data and the difference update data stored in the second storing device for each processing unit. That is, a position at which the merge data is recorded acts per se as information to define the relationship between the original data and the difference update data. Therefore, the navigation processing can be performed efficiently, using the updated data including the merge data therein, as discussed below.

That is, specifically, the original data is stored in the first storing device, with an empty area that is disposed in the original data for each processing unit such as a node or link to designate an individual road in the route searching (i.e. in each node or each link). For instance, at least a part of the merge data (e.g. flag information part, as mentioned below in detail) corresponding to each processing unit of the original data is recorded in the empty area, by means of the re-writing device provided with a memory management task or the like. Another part of the merge data (e.g. jump address information part, as mentioned below in detail) may be further written over a predetermined position (e.g. a record area of jump address information) in the original data. Thereby, the updated data or the re-written data is newly generated independently of or instead of the original data. Incidentally, the correlation between the original data and the merge data is accomplished by attaching label information for indicating the relationship between the original data and the merge data to each of the original data and the merge data, by each processing unit or by each parcel unit including a plurality of processing units. Reference to and comparison with the label information makes it possible to select the corresponding merge data, and to record it into the original data. Furthermore, offset information as mentioned below can be used to facilitate identifying the relationship.

The merge data includes information capable of directly overwriting, on the basis of a pre-set code, a predetermined part of the original data, in which various information such as road classification information indicating road type such as a national road or prefectural road, regulation information indicating information such as one-way traffic, or signal information is recorded on the basis of the predetermined code for the map data. Alternatively, it includes information, such as text information, capable of overwriting directly a predetermined part of the original data, in which road names and the like are recorded. Alternatively, it includes information indicating an addition or deletion of a road (i.e. node or link) otherwise indicating an existence of the difference update data corresponding to the original data and capable of being recorded into the empty area in the original data.

The re-writing device may be arranged so as to write a flag information indicating whether or not a road is added, a flag information indicating whether or not a road is deleted, otherwise a flag information indicating whether or not the node or link to be accessed next by the processing device is included in the difference update data, into the predetermined empty area. Alternatively, the re-writing device may be arranged to overwrite information of the original data, in which the map data is recorded in a pre-set code or information of the original data in which predetermined road information or the like is recorded, directly with the information of the merge data.

Then, for instance, the processing device including the microprocessor or the like may make access to the updated data to read its information. Relating to this, for instance, the part of the merge data that is written over the original data directly by the re-writing device is read as it is, to perform the navigation processing. On the other hand, if the processing device reads the merge data part of the flag information that indicates the road deletion or addition and is recorded into the empty area, the road that is designated by the flag information is recognized as deleted or added to perform the navigation processing. Furthermore, the processing device also reads information indicating a relationship between the original data and the difference update data, the relationship being defined by a part of the updated data corresponding to the merge data. The information indicating the relationship may be embodied in an address or the like of the difference update data to be accessed next, in addition to or instead of the flag information indicating whether or not the node or link to be accessed next, for example, is included in the original data. As a result of reading the flag information, if the corresponding difference update data exists, the node or link for example, which is stored in a predetermined position of the difference update data, may be accessed to perform the navigation processing on the basis of the content thereof, or if the corresponding difference update data does not exist, the navigation processing is performed without the access to the difference update data.

Consequently, only in the case that the difference update data is required to be read, the processing device can access the difference update data, and thereby the access to the difference update data is improved in its efficiency. That is, the workload of the processing device can be reduced, resulting in an improvement in the processing speed of the navigation apparatus as a whole.

Furthermore, an addition of new information to the original data is allowed merely by writing the merge data into the empty area or overwriting the merge data over an already recorded area, without changing the size, format, arrangement or the like of the original data. That is, for instance, in order to change a part of information that is included in the original data, a road type may be changed, or a road name may be changed, by overwriting directly the part of information. Furthermore writing new information into the empty area allows the change or addition of the road data, avoiding an effect on the other part of the original data, i.e. without changing the size, format, arrangement or the like of the original data. Therefore, the navigation processing can be performed properly, even if the difference update data is reflected into the original data. In other words, even in the case that the difference update data is reflected into the original data, the navigation processing can be performed in the same manner before reflecting the difference update data, without changing the navigation processing itself. Incidentally, the KIWI-format mentioned above is convenience and advantageous to perform this invention, since the map data includes an empty area sufficient to accommodate (record) the merge data having the data structure as mentioned in the present invention, for each unit of node or each unit of link.

Incidentally, the merge data may be stored in the second storing device to be used, or may be acquired professing unit by processing unit in the navigation processing via the wired or wireless communication device, otherwise the merge data may be acquired in its entirety at a time. Alternatively, the merge data that is acquired via the communication device may be stored into the second storing device so that the merge data that is once stored is re-used.

Furthermore, the updated data may be generated every time when a processing, including for example the route searching in a specific area, is performed, may be used for example on the record area of a DRAM or the like, otherwise may be stored into the first storing device or other storing devices (e.g. a third storing device as mentioned below) to be re-used. Furthermore, depending on the merge data as a whole (i.e. depending on the original data as a whole), it may be generated collectively at a time, or may be generated for a parcel unit, a unit of screen or the like. Alternatively, it may be generated separately from the original data, or may be generated by directly overwriting the original data.

In an aspect of the navigation apparatus according to the present invention, the re-writing device re-writes a part of the original data with at least a part of the merge data, in addition to or instead of re-writing the merge data at least partially into the empty area.

According to this aspect, at least a part of the merge data can be reflected into the original data, by recording the part of the merge data into a predetermined area occupying a part of the original data (i.e. by directly overwriting). For instance, the re-writing device can overwrite a part of the original data in which a plurality of kinds of codes are recorded, with predetermined kinds of code that are included in the merge data. Thereby, similarly to the case that a part of the merge data is recorded into the empty area, the updated data based on the predetermined format of the original data can be generated relatively readily. That is, even if the difference update data is reflected into the original data, the navigation processing can be performed in the same manner before reflecting the difference update data, without changing the navigation processing itself.

In another aspect of the navigation apparatus according to the present invention, the original data includes, for the each processing unit, jump address information indicating an address of one processing unit to be accessed next to another one processing unit for the navigation processing, and the re-writing device writes flag information as a part of the merge data into the empty area, the flag information indicating whether the jump address information is included in the original data or in the difference update data.

According to this aspect, the jump address information indicating the address of the processing unit to be accessed next facilitates the description of association of the processing unit (i.e. a node unit or link unit as mentioned below). Furthermore, the re-writing device is arranged to write the flag information that is included in a part of the merge data into a predetermined empty area. The flag information may indicate whether or not the processing unit to be accessed next (i.e. jump destination) is included in the original data or included in the difference update data, for example by a binary flag. The access to the flag information by the processing device facilitates a judgement whether or not the processing unit to be accessed next is included in the original data or included in the difference update data. That is, if the flag information is not included in the original data, searching all the difference update data for the appropriate data is required, because it is not cleared whether or not the processing unit that is included in the difference update data is to be used. On the other hand, in this invention, the existence of the flag information allows the judgement whether or not the processing unit in the difference update data is to be used, and allows the processing device to access the difference update data only in the case that the processing unit that is included in the difference update data is required. Thereby, a wasteful access to the difference update data is eliminated, resulting in the efficient navigation processing.

As discussed above, in the navigation apparatus including the jump address information, the re-writing device may re-write the jump address information with at least a part of the merge data.

According to this aspect, for instance, writing a part of the merge data into a processing unit that is included in the original data, e.g. the jump address information, allows the part of the data to be reflected into the original data. For instance, by re-writing or overwriting the jump address information of the node or link included in the original data with address information that may be included in the merge data, a node or link to be accessed next to the node or link can be changed readily while the format of the original data is maintained. That is, even if the merge data is reflected into the original data, the navigation processing can be performed in the same manner before reflecting the difference update data, without changing the navigation processing itself.

In another aspect of the navigation apparatus according to the present invention, the second storing device stores the merge data as well as the difference update data.

According to this aspect, it is possible to store the merge data in advance, an acquisition of the merge data for every navigation processing is not required. Moreover, even in the case that the map data is updated many times, a combination of the difference update data and the merge data is achieved readily and always maintained as appropriate. Thus, the navigation processing can be performed efficiently.

As discussed above, in the aspect of storing the merge data in the second storing device, the second storing device includes a removal type record medium, in which the difference update data and the merge data is recorded.

According to this aspect, the second storing device is provided with a removal type information record medium including a light and small removal type (i.e. portable or carriageable type) record medium such as a memory card, a memory stick or an IC card, a re-writable optical information record medium such as a flexible disk or a DVD-RAM, or a semiconductor memory such as a DRAM. Thereby, a supplier or the like of maps or navigation systems may distribute easily the removal type record medium to an owner, user or the like of the navigation apparatus via mail, courier or the like. Therefore, an environment efficient for an individual user of the navigation apparatus to access the difference update data with the merge data is readily achieved.

In another aspect of the navigation apparatus according to the present invention, the navigation apparatus may be further provided with a communication device for receiving at least one of the difference update data and the merge data via a communication network, and the second storing device stores the difference update data received by the communication device.

According to this aspect, for instance, receiving the difference update data and the merge data including the latest map information is feasible owing to a data transmission with a data distribution center or the like, using for instance the communication device including transceivers or a cell phone, via for instance the communication network regardless of wired or wireless. Thereby, the supplier of maps or navigation systems can distribute easily a set of the difference update data and the merge data to the owner, user or the like of the navigation apparatus via for instance Internet or the like. Therefore, an environment efficient for an individual user of the navigation apparatus to access the difference update data with the merge data is readily achieved.

Incidentally, the reception of the difference update data or the merge data may be performed automatically at regular intervals or at irregular intervals by the communication device. Thereby, the user of the navigation apparatus can utilize the navigation apparatus with the map data in which the latest road conditions is reflected, without concern about the distribution of the difference update data and the merge data. Alternatively, in response to the distribution request that is given through an external input device such as a remote controller by the individual user of the navigation apparatus, the reception of the difference update data and the merge data may be performed. In any case, unless the supplier of the difference update data and the merge data updates the data, or unless the latest version of the difference update data and the merge data is not distributed to the navigation apparatus, the data distribution is not required regardless of the distribution request from the navigation apparatus.

Alternatively, the re-writing device may give the distribution request for the merge data only if the merge data is required to generate the updated data. Alternatively, the processing device may give the distribution request for the difference update data, only if an access to the difference update data is required after an access to the updated data already generated. In this case, if the merge data or the difference update data is not required, the navigation processing can be performed efficiently, only by making access to the original data or the updated data, without a transmission of the data distribution request or the like. Thereby, the navigation processing can be performed efficiently only by retaining an essential and minimal merge data or the difference update data in the navigation apparatus.

Additionally, owing to storing the received difference update data in the second storing device, a necessity of receiving the merge data or the difference update data common for each navigation processing is eliminated, resulting in the efficient navigation processing with the difference update data in which the latest road conditions is reflected.

In another aspect of the navigation apparatus according to the present invention, the first storing device may be provided with a re-writable type storing device for storing the updated data instead of or in addition to the original data.

According to this aspect, the processing device does not access the original data but the updated data to perform the navigation processing as a matter of fact. Thereby, storing the updated data into the first storing device such as a hard disk, a DVD-RAM or a DVD-RW eliminates a necessity to generate the updated data every time when the navigation processing is performed, and thereby reduces the duty on the navigation apparatus and improves the processing speed.

Incidentally, the updated data to be stored in the first storing device may be generated or stored in a parcel unit or a unit of screen, otherwise may be generated and stored collectively to the original data as a whole.

Alternatively, the updated data that is already used for the navigation processing may be stored in the first storing device every time when the navigation processing is performed and then re-used if it is required in the following navigation processing.

Alternatively, only the updated data that is obtained by overwriting the original data itself may be stored in the first storing device. Thereby, a necessity of storing both the original data and the updated data into the first storing device is eliminated, resulting in a reduction in a required memory capacity.

In another aspect of the navigation apparatus according to the present invention, the apparatus may be further provided with a re-writable type third storing device for storing the updated data, wherein the first storing device is a read-only type storing device.

According to this aspect, the original data including the map data is stored into the first storing device including the read-only type information record medium such as a CD-ROM or a DVD-ROM, while only the updated data is stored into the third storing device including the re-writable type information record medium such as a hard disk, separately from the original data. Thereby, the updated data can be utilized without changing the other data such as the original data.

In another aspect of the navigation apparatus according to the present invention, the re-writing device generates the updated data at a time in accordance with a whole of the difference update data and the merge data.

According to this aspect, a necessity of generating the updated data for each processing unit of the original data or for each navigation processing is eliminated, generating the updated data only once by the drawing device is sufficient for the same merge data and the difference update data. Thereby, the duty on the re-writing device is reduced. That is, the duty on the navigation apparatus is reduced, resulting in an improvement in the processing speed.

In another aspect of the navigation apparatus according to the present invention, the re-writing device generates the updated data partially in accordance with a part of the difference update data and the merge data corresponding to a data range to be used in the navigation processing.

According to this aspect, a capacity of the updated data can be reduced, by generating the updated data in a unit. Therefore, a processing only on the semiconductor memory such as a DRAM can be achieved. Thereby, the navigation processing is feasible at relatively high speed. For instance, during the navigation processing, the map data relating to the map to be displayed along with a run of the vehicle may be arranged in such a manner that the updated data is reproduced successively.

In another aspect of the navigation apparatus according to the present invention, the map data includes node data indicating a node corresponding to a predetermined point in a pre-set road network and link data indicating a link corresponding to a part of a road between two nodes, and each processing unit is a unit divided into a node part and a link part.

According to this aspect, information consisting of the map data may be the node data to represent the "node" that is defined as a predetermined point on the map such as a traffic intersection, and the link data to represent the "link" that is defined as a line or link between two nodes (e.g. road or the like). Thereby, the navigation processing can be performed only with focusing on two processing object (i.e. node and link). That is, the operability or handling of the map data in the navigation apparatus is improved.

Particularly, with regard to a processing unit of the navigation processing, a processing unit among the nodes (i.e. a node unit) or a processing unit among the links (i.e. a link unit) is preferable to perform a route searching as a typical navigation processing. Therefore, using the merge data that is recorded in the empty area that is in turn disposed by a node unit or by a link unit facilitates to reduce an amount of data to be processed at a time in the navigation apparatus. Therefore, the duty on the navigation apparatus is reduced, resulting in an improvement in the processing speed.

Incidentally, the link data may include information about a link between nodes (i.e. road conditions including road type or regulation information), as well as information to represent the link between two nodes. Alternatively, the link data may include flag information indicating whether a node to be accessed next is included in the original data or included in the difference update data.

As mentioned above, in the aspect in which the unit for processing in the navigation processing is a unit defined within nodes or links, independently of links or nodes, respectively, the navigation processing is for making access to the original data and the difference update data to trace the link connected to the node.

According to this invention, for instance, a route between a predetermined point and another predetermined point on the map data may be designated by a combination of multiple units in which a unit may consist of a node and another node to be accessed next to the former as well as a link therebetween. Thereby, the navigation apparatus can designate the route or the road conditions notifying a fact that the predetermined point is an intersection relatively readily by making access sequentially to multiple nodes and/or links in the map data.

A format of the map data embodied in this aspect may be the KIWI-format.

In another aspect of the navigation apparatus according to the present invention, the merge data includes data size information indicating data size as well as offset information indicating an offset of the difference update data corresponding to the merge data from an address of the original data.

According to this aspect, the merge data includes information to define the relationship (i.e., the correlation) between the original data and the difference update data as well as the information to update information in the original data, and further includes the size information as well as the offset information to define a position (i.e. address) in the original data at which the former two kinds of information are to be recorded. The offset information is for defining what address the merge data is to be recorded at, which may be offset from a head address of a unit for processing in the original data. The size information is for defining the size of the merge data to be merged into the original data. Thereby, it is easy to know the address of the data in the original data to be upgraded (i.e.,, updated or re-written) and the size of the data to be upgraded (i.e., updated or re-written). Thereby, the duty on the re-writing device can be reduced, resulting in an improvement in the processing speed. That is, the processing speed in the navigation apparatus can be improved.

In another aspect of the navigation apparatus according to the present invention, with regard to a part of the original data which is described by a plurality of kinds of codes set in advance, said re-writing device re-writes the code directly in accordance with the merge data.

According to this aspect, because the re-writing device updates a part of data, for which a predetermined code as the map data is recorded, including road classification information to classify road type such as a national road or a prefectural road, regulation information to indicate information about one-way traffic, or signal information to indicate an existence or inexistence of a traffic signal in a intersection, directly on the basis of the merge data, road conditions, which is relatively readily updated, can be reflected into the map data. Furthermore, updating with the predetermined code that is defined on the map data allows the updated road conditions to be reflected into the map data, without changing the size, format, arrangement or the like of the original data.

Similarly, with regard to a predetermined length of data, it may be overwritten with a part of the merge data while maintaining the predetermined length. For instance, a part of data having a fixed field among the original data such as road names or the like may be overwritten with text data to designate a road name corresponding to the data length of the fixed field, and thereby the updated road conditions can be reflected into the map data, without changing the format of the original data.

The above object of the present invention is achieved by a navigation method in a navigation apparatus provided with: a first storing device for storing original data for a navigation based on a predetermined format and including map data, in such a manner that an empty area exists on the predetermined format in each processing unit for a predetermined kind of navigation processing; and a second storing device for storing difference update data representing a data portion for the navigation that is updated with respect to the original data as a standard. The navigation method includes: a re-writing step of generating updated data based on the format and including the original data and merge data, by re-writing the merge data at least partially into the empty area corresponding to the merge data, the merge data defining a relationship of the difference update data stored in the second storing device with respect to the original data stored in the first storing device for the each processing unit; and a processing step of (i) making access, for the each processing unit, to the original data and the merge data in the updated data, and (ii) if the accessed data is the merge data, then also making access to the difference update data, the relationship of which is defined by the merge data and which is stored in the second storing device, and (iii) performing the navigation processing on the basis of the accessed original data and the accessed difference update data.

According to the navigation method of the present invention, similarly to the above-mentioned navigation apparatus, the navigation processing can be performed using the updated data obtained from merging the merge data including information to regulate the difference update data corresponding to the processing unit in the original data into the original data, without changing the size, format and arrangement of the original data or the like. Alternatively, the difference update data can be accessed efficiently, on the basis of the relationship between the difference update data and the original data indicated by the merge data in the updated data.

Incidentally, the navigation method of the present invention may also have various aspects, in accordance with various aspects of the navigation apparatus of the present invention.

The above object of the present invention is achieved by a computer program product in a computer-readable medium for tangibly embodying a program of instructions executable by a computer to make the computer function as at least a part of the above described navigation apparatus of the present invention.

According to the computer program product for the navigation processing of the present invention, the above-mentioned navigation apparatus of the present invention can be relatively readily achieved, by reading the computer program product from the record medium for storing the computer program product such as a ROM, a CD-ROM, a DVD-ROM, a hard disk or the like and running the program product, or by downloading the computer program product via a communication device into the computer and running the computer program product.

Incidentally, the computer program product of the present invention for the navigation processing can also have various aspects, in accordance with the above-mentioned various aspects of the navigation apparatus of the present invention.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

The embodiments of the navigation apparatus and method according to the present invention will now be discussed, with reference to drawings.

(Fundamental Construction)

Figure 1:
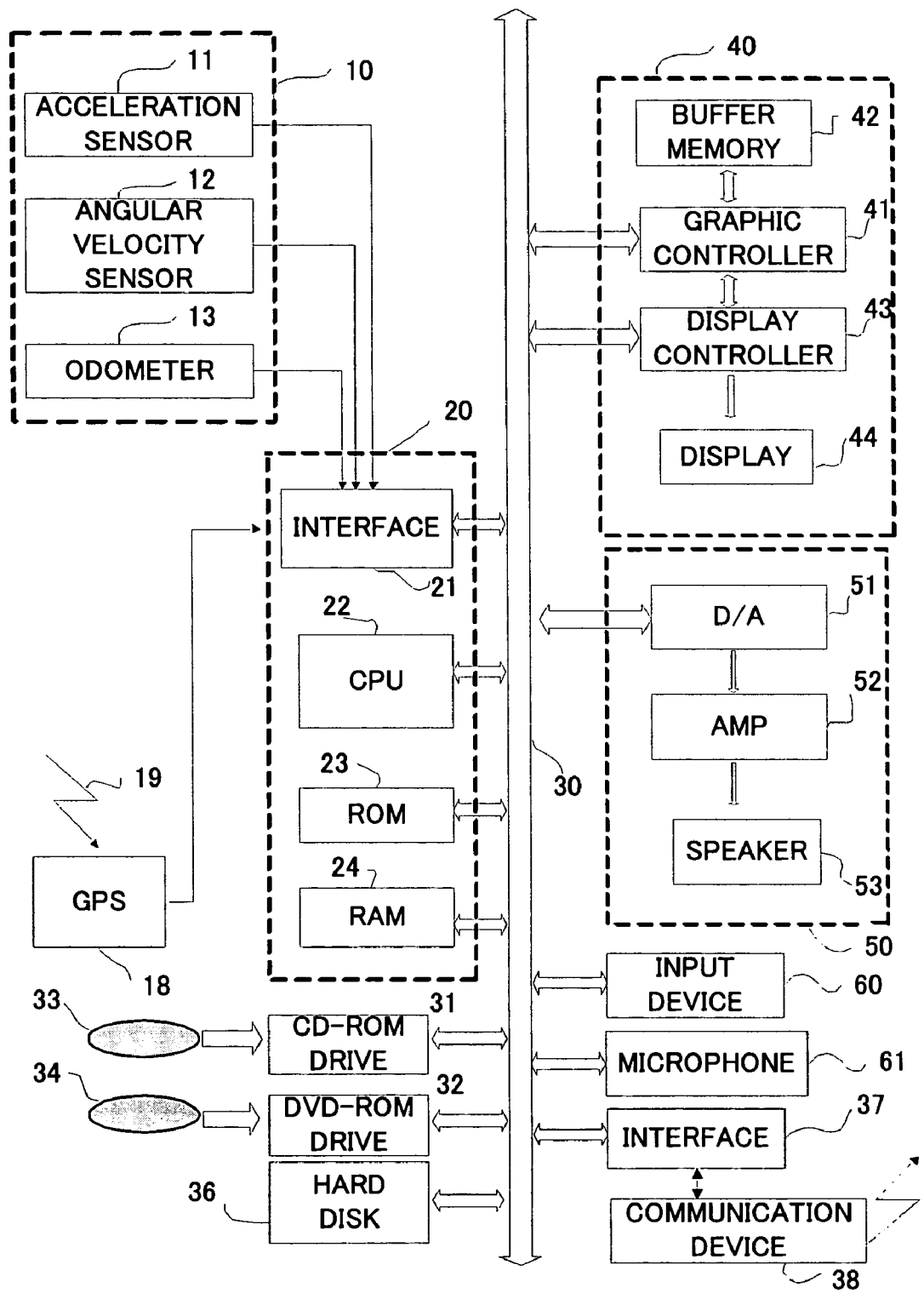
FIG. 1 is a block diagram illustrating a fundamental construction of a navigation apparatus according to an embodiment of the present invention.

Firstly, with reference to FIG. 1, a fundamental construction of a navigation apparatus according to the present invention will now be discussed. FIG. 1 is a block diagram illustrating a construction of the navigation apparatus according to the present embodiment.

As shown in FIG. 1, the navigation apparatus is provided with a sensor unit 10, a GPS receiver unit 18, a control unit 20, a data bus 30, a CD-ROM drive 31, a DVD-ROM drive 32, a hard disk 36, a video output unit 40, an audio output unit 50, an input device 60, a microphone 61 and a communication device 38.

The sensor unit 10 is for obtaining information about movement of an object to be navigated (may called as a "navigation object") and includes an acceleration sensor 11, an angular velocity sensor 12 and an odometer 13. The acceleration sensor 11 is for detecting acceleration of the object and capable of calculating the velocity from the detected acceleration. The angular velocity sensor 12 is for detecting the angular velocity of the object. The odometer 13 is for detecting a travel distance of the object.

The GPS receiver unit 18 is, for example with a receiver, capable of locating a current position of the navigation object by transmitting and receiving information to and from GPS satellites via a radio wave 19.

The control unit 20 is for controlling the navigation apparatus as a whole and includes an interface 21, a CPU 22, a ROM 23 and a RAM 24. The interface 21 is for transferring (transmitting and receiving) data between the sensor unit 10 and the GPS receiver unit 18 and for outputting the received data to the CPU 22. The CPU 22 is for locating the current position of the navigation object by means of data that is inputted through the interface 21. The CPU 22 is for controlling the navigation apparatus as a whole through a calculation processing. In this embodiment, particularly, the CPU 22 controls the CD-ROM drive 31, the DVD-ROM drive 32 or the hard disk 36, as described in detail below, to read map data, merge data or difference update data from a CD-ROM 33, a DVD-ROM 34 or the hard disk 36 and store the read data into the RAM 24. Alternatively, the map data, the merge data or the differential update data received at the communication device 38 may be stored into the RAM 24. Then, on the basis of the data stored in the RAM 24, updated data (i.e., re-written data) is generated to perform the navigation processing. A microprogram or the like is recorded in the ROM 23 for controlling operation of the control unit 20. The RAM 24 is used as a record medium to record data during processing by the CPU 22 and includes volatile semiconductor memory such as a DRAM, a SDRAM or the like.

The data bus 30 is used to transfer data among the control unit 20, the CD-ROM drive 31, the DVD-ROM drive 32, the hard disk 36, the video output unit 40, the audio output unit 50, the input device 60 and a communication interface 37.

The CD-ROM drive 31 or the DVD-ROM drive 32 is a device to read the CD-ROM 33 or the DVD-ROM 34 in which the original data including the map data is stored.

The hard disk 36 is for storing the map data, the merge data or the differential update data instead of storing them into the CD-ROM 33 or the DVD-ROM 34. The hard disk 36 is also for reading the map data, the merge data or the differential update data under control of the CPU 22.

The video output unit 40 is provided with a graphic controller 41, a buffer memory 42, a display controller 43 and a display 44, for displaying road conditions, route guidance or the like in accordance with the navigation processing under control of the control unit 20, or for displaying a screen to input an external instruction via the input device 60. The graphic controller 41, which may includes a microcomputer or the like, is for controlling the display processing as a whole. The buffer memory 42, which may include a semiconductor memory such as a DRAM or the like, is for storing the video data to be processed and for inputting or outputting the video data in accordance with an I/O (input-output) instruction of the graphic controller 41. The display controller 43 is for controlling the display 44 to perform the display processing under control of the graphic controller 41. The display 44, which may include an LCD, a CRT display or the like, is for displaying the video data on it.

The audio output unit 50 includes a D/A (digital-analog) converter 51, an amplifier 52 and a speaker 53, for outputting sound in accordance with the navigation processing under control of the control unit 20. The D/A converter 51 is for converting a digital audio signal, which is generated in the navigation apparatus, into an analog audio signal. The amplifier 52 is for amplifying the analog audio signal, which is converted from the digital audio signal, and for controlling the output level. The speaker 53 is for outputting sound, which is converted from the analog audio signal that is amplified and outputted from the amplifier 52.

The input device 60, which may include a remote controller, a controller, a touch panel or the like, is for receiving an external instruction to the navigation apparatus.

The microphone 61 is for receiving an audio input directly from a user of the navigation apparatus.

The communication interface 37 is for an I/O control of data in relation to each device, the data being transmitted and received by the communication device 38 via a data transfer with a data center.

The communication device 38, which includes a transceiver or the like capable of transferring information via a wired or wireless communication network, may perform a data transfer with the data center or the like to transfer the required information.

(Operation Principle)

Figure 2:
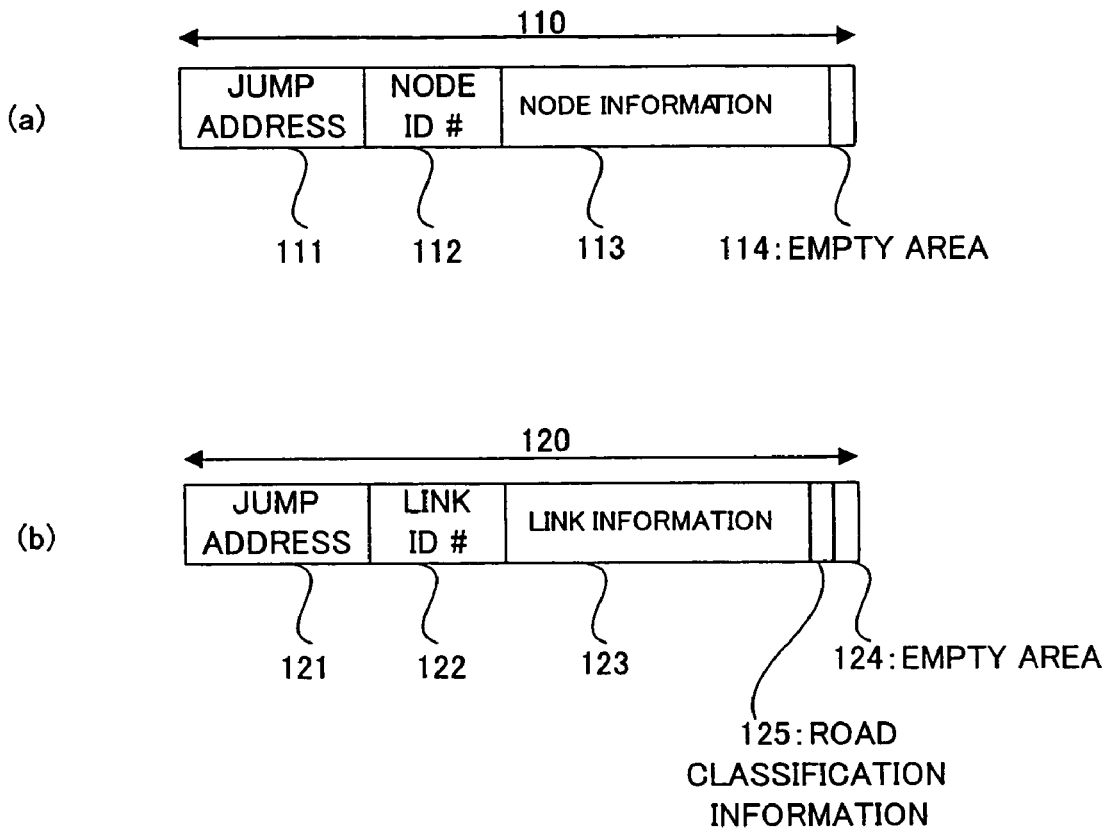
FIG. 2(a) and FIG. 2(b) are schematic views illustrating a unit of the original data to be processed including the map data used for the navigation apparatus according to the embodiment of the present invention.
Figure 3:
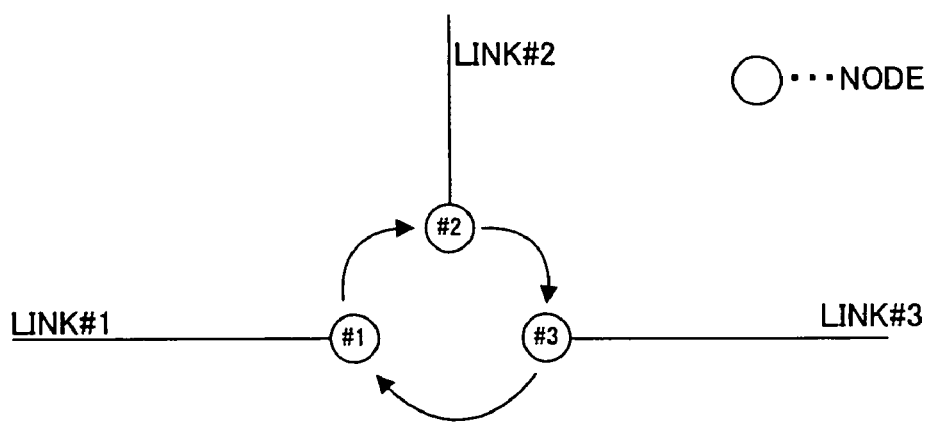
FIG. 3 is a conceptual view illustrating an exemplary predetermined intersection used for the navigation processing by the navigation apparatus according to the embodiment of the present invention.
Figure 4:
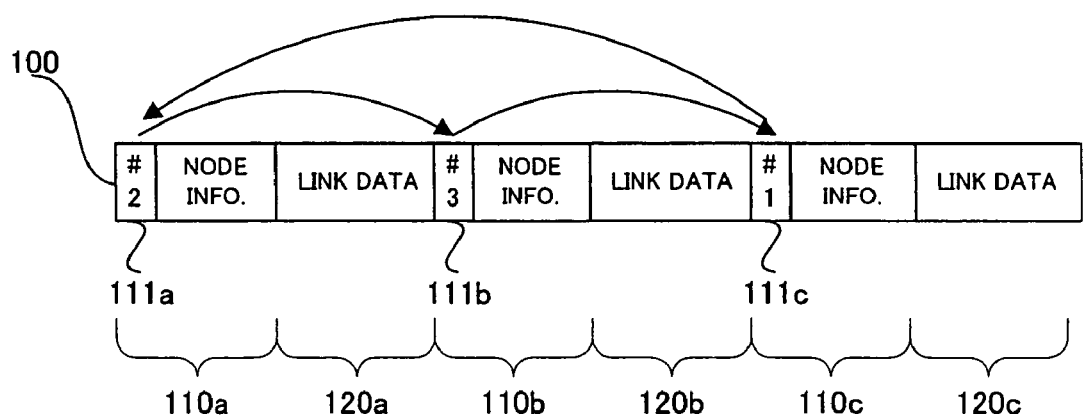
FIG. 4 is a conceptual view illustrating a data structure of an original data representing the predetermined intersection according to the embodiment of the present invention.
Figure 5:
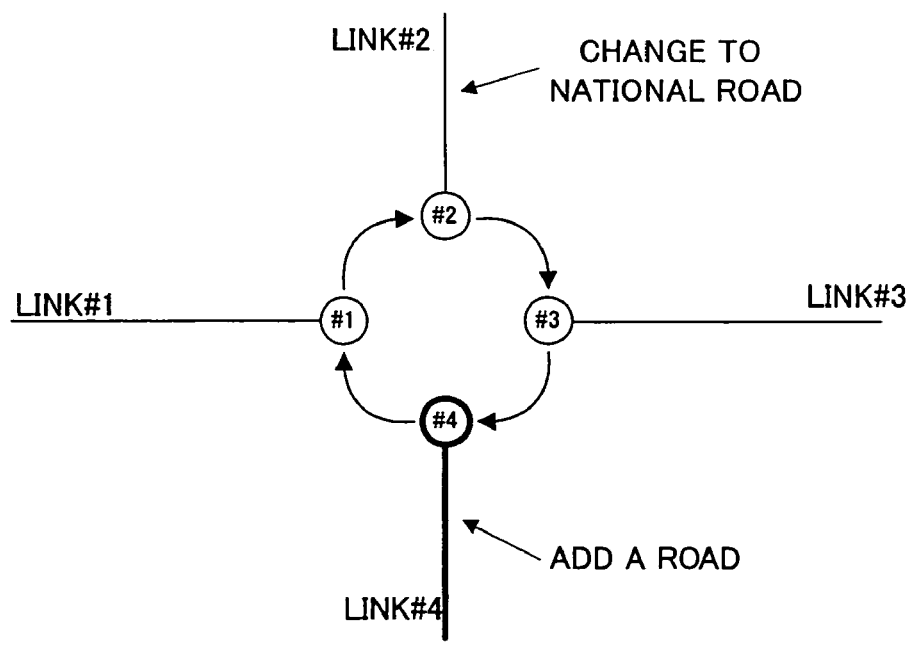
FIG. 5 is a conceptual view illustrating another exemplary predetermined intersection used for the navigation processing by the navigation apparatus according to the embodiment of the present invention.
Figure 6:
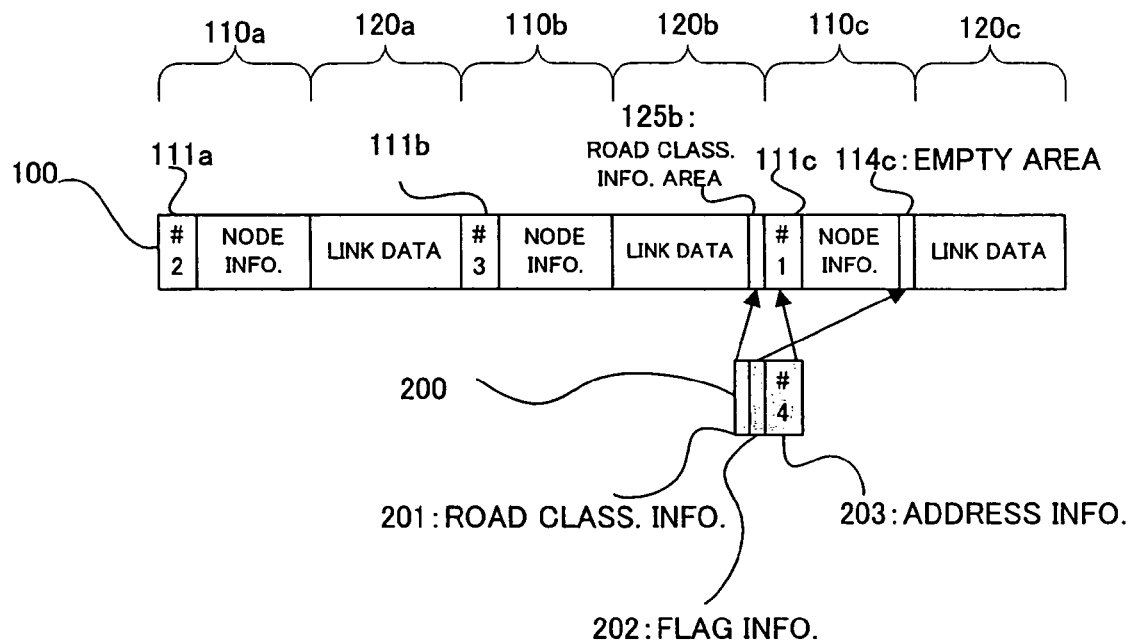
FIG. 6 is a conceptual view illustrating a data structure of original data and merge data representing the predetermined intersection according to the embodiment of the present invention.
Figure 7:
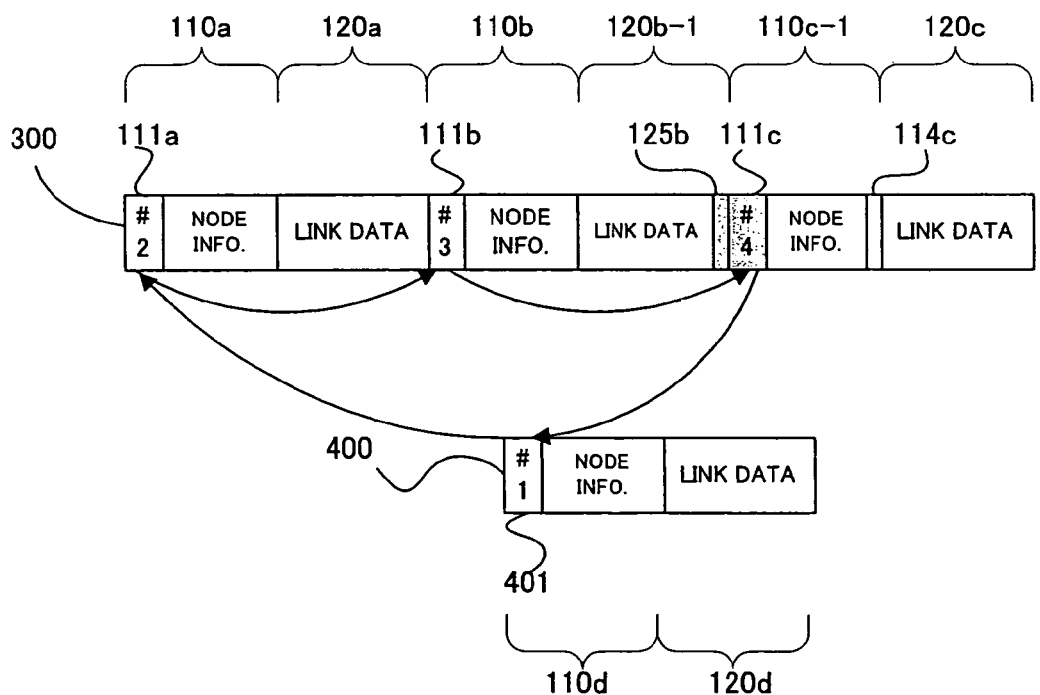
FIG. 7 is a conceptual view illustrating a data structure of updated data and difference update data representing the predetermined intersection according to the embodiment of the present invention.

Now reference is made to FIG. 2(a) to FIG. 7, and the operation principle of the navigation apparatus according to the present invention will be discussed, on the basis of specified embodiments. FIG. 2(a) and FIG. 2(b) illustrate a processing unit of the original data including the map data used for the navigation apparatus according to the present embodiment. FIG. 3 illustrates an operation of the navigation apparatus when processing a certain intersection made of three roads. FIG. 4 illustrates a data structure of the original data representing the intersection in FIG. 3. FIG. 5 illustrates an intersection in which another road is added to the intersection in FIG. 3. FIG. 6 illustrates a data structure of the original data and the merge data representing the intersection in FIG. 5. FIG. 7 illustrates a data structure of an updated data and a difference update data representing the intersection in FIG. 5.

As shown in FIG. 2(a) and FIG. 2(b), the original data to be used for the navigation apparatus according to the present embodiment, which includes the map data and based on a predetermined format, may include node data 110 that is representative of a "predetermined point on the map" (i.e. a node) and link data 120 that is representative of a road between two nodes. The original data includes a plenty of node data 110 and a plenty of link data 120.

In FIG. 2(a), the node data 110 may include a jump address 111 (i.e., a jump target address), which designates an address of a to-be-accessed node or link on the map data, a node ID (identifying) number 112, which designates node ID information, and node information 113, which is a substantial information part of the node. Further, the node information 113 has at least an empty area 114 (i.e., a reserved area) in a predetermined position. For example, flag information or the like to indicate whether or not the to-be-accessed node data 110 is included in the difference update data as mentioned below may be recorded into the empty area 114, in accordance with a position of the empty area 114 on the node data 110. That is, for example, only in the case that there is the flag information to indicate that the to-be-accessed node data 110 is included in the difference update data, a configuration that the control unit 20 accesses the difference update data may be achieved. In this case, the position itself of the empty area 114 at which the flag information or the like may be recorded is meaningful. That is, the flag information or the like that is recorded in the empty area 114 is information to designate the jump address or the like of the node data 110 having the empty area 114 in which the flag information or the like is recorded, but is not information to designate the jump address or the like of another node data 110. Thus, there is no need to construct a jump list or table of each node data 110 separately from the original data or the node data 110. Further, there is no need of a processing to access the jump list or the like. Therefore, it is very advantageous in reduction in data amount and processing load.

In FIG. 2(b), the link data 120 may include, for example, a jump address 121 to designate an address of the to-be-accessed node or link on the map data, a link ID number 122 to designate link ID information, and link information 123 that is representative of link information. The link information 123 includes, for example, (i) information to classify roads, for example, into national roads, prefectural roads or the like, (ii) information about regulations such as one-way traffic, and/or (iii) other information, which is recorded in a predetermined position in accordance with a predetermined code. Alternatively, information about road names may be recorded in a predetermined position in a text format, for example. For example, the information to classify roads, for example, into national roads, prefectural roads or the like is recorded in a certain binary code or certain hexadecimal code into a road classification information area 125. For example, from the first, a code "001" may be assigned to a national road, a code "011" may be assigned to a prefectural road, and a code "111" may be assigned to a private road, each of these code is recorded in a certain length of field to designate the road type in the link data 120 (e.g. the road classification information area 125). On the other hand, with regard to data to designate the road name, for example, if it is recorded in a text format into a certain length of field, the road name can be changed without changing the length or arrangement of data in the format. Further, the link information 123 includes at least one empty area 124 (i.e., a reserved area) in a predetermined position. With regard to the empty area 124, similar to the empty area 114 of the node data 110 previously mentioned, the position itself of the empty area 124 in which information is recorded is meaningful. That is, information or the like, which is recorded into the empty area 124, is information to designate the jump address, same as in the case of the node data 110, and is not information to designate the jump address of another link data 120.

Incidentally, in FIG. 2(*a*) and FIG. 2(*b*), the jump address 111 and 112 are disposed at a head of the node data 110 and the link data 120, respectively, for convenience of explanation. Nevertheless, these addresses as logical addresses or physical addresses are not necessarily disposed at the head of each data, and may be disposed at an end of each data. Relating to this, for example, an access to the jump address 111 or 121 is performed, after reading the node data 110 or link data 120 including the jump address 111 or 121, or after data processing with the node data or the link data. Further, with regard to the empty area 114 and 124, they are not necessarily disposed at the position exemplified in FIG. 2(*a*) and FIG. 2(*b*), and may be disposed at a certain position conformed to a certain format. Further, the same thing can be said of the road classification information area 125.

The original data, which includes a plenty of node data 110 and a plenty of link data 120 as shown in FIGS. 2(*a*) and 2(*b*), is stored in the CD-ROM 33, the DVD-ROM 34 or the hard disk 36, which is shown in FIG. 1. The original data stored as mentioned above is read by the control unit 20, in a form of node data 110 or link data 120, otherwise in a unit of parcel including therein a plenty of node data and a plenty of link data, and then stored into the RAM 24.

As shown in FIG. 3, a T-shaped intersection is designated by three links and three nodes on the map data. ID information #1, #2 or #3 as the link ID number 122 is assigned to three links, respectively. As well, ID information #1, #2 or #3 as the node ID number 112 is assigned to three nodes, respectively. Furthermore, a node to be accessed next is associated with each node. If this association forms a loop, the control unit 20 identifies that the nodes forming the loop constitute an intersection. For example, in the case of FIG. 3, the node to be accessed next to the node #1 is associated with the node #2, the node to be accessed next to the node #2 is associated with the node #3, and the node to be accessed next to the node #3 is associated with the node #1, and these nodes form together a loop. Therefore, the control unit 20 identifies that the node #1, the node #2 and node #3 form together an intersection.

As shown in FIG. 4, the original data 100, which includes the map data about the T-shaped intersection as shown in FIG. 3, is provided with three node data 110 and three link data 120. That is, the original data 100 is provided with node data 110*a* of the node #1, node data 110*b* of the node #2 and node data 110*c* of the node #3, link data 120*a* of the node #1, link data 120*b* of the node #2 and the link data 120*c* of the node #3. The jump address of each node data designates an address of the node to be accessed next. That is, the jump address 111*a* of the node #1 designates the node #2, the jump address 111*b* of the node #2 designates the node #3 and the jump address 111*c* of the node #3 designates the node #1. Therefore, the control unit 20 can read the jump address and access each node sequentially as shown by arrows in FIG. 4.

Next, as shown in FIG. 5, assume that another road is added to the T-shaped intersection in the original data, and the road designated by the link #2 is changed from a prefectural road to a national road. In this case, a node #4 and link #4 to designate the new added road is also added to form one intersection. Hereinbelow, the operation principle of the navigation apparatus in this case will be described.

As shown in FIG. 6, merge data 200, which includes information to indicate the addition of the node #4 and link #4, may be provided with (i) road classification information 201 to indicate a new road type of the link #2, (ii) flag information 202 to indicate that the jump address of the node #3 is changed to new one that is included in a difference update data 400 mentioned below, and (iii) address information 203 to indicate the new jump address of the node #3. The merge data 200 may be stored in the CD-ROM 33, the DVD-ROM 34 or the hard disk 36. Further, each of the road classification information 201, the flag information 202 and the address information 203 includes information to identify a corresponding unit to be processed (i.e. node or link) in the original data 100, such as label information.

In order to read the processing unit of the original data 100 to be processed, the control unit 20 reads only the information including the label information corresponding to the ID number of the processing unit from among information in the merge data 200 (i.e. for example, the road classification information 201, the flag information 202 or the address information 203) to generate an updated data (i.e., re-written data) 300 mentioned below. On the other hand, each of the road classification information 201, the flag information 202 and the address information 203 includes, instead of or in addition to the above-mentioned label information, offset information to indicate the address, at which a writing or an updating with the merge data is started, and to indicate how far the address is from the head address of the processing unit of the original data 100, and further includes size information to indicate a size to be recorded from the address designated by the offset information. Thereby, the control unit 20 may identify that the road type 201 is recorded into the road classification information area 125*b* of the link data 120*b,* for example. Similarly, the control unit 20 may recognize that the flag information 202 is to be recorded into the empty area 114*c* of the node data 110*c* as well as the address information 203 is to be recorded at the jump address 111*c* of the node data 110*c*. Thereby, the control unit 20 records information included in the merge data 200 onto a predetermined position in the original data 100. Thus, an updated data 300 as shown in the upper section of FIG. 7 is generated and stored into the RAM 24.

As shown in the upper section of FIG. 7, the updated data 300, in which information about the newly added node #4 and link #4 is recorded, has a structure conformed with a predetermined format same as that of the original data. That is, the updated data 300 is obtained by updating the information recorded in the road classification information area 125 of the link data 120*b* with the road classification information 201 designating a national road, recording the flag information 202 into the empty area 114*c* of the node data 110*c,* and updating the jump address 111*c* of the node data 110*c* with the address information 203 designating the node #4, on the basis of the original data 100.

For this reason, during the operation, the control unit 20 reads each node data 110 or link data 120 sequentially in accordance with the jump address to perform the navigation processing. Here, in order to read a link data 120*b*-1 obtained by updating the link data 120*b,* the control unit 20 performs the navigation processing with the recognition that a road designated by the link #2 is a national road, since the road classification information area 125 is updated or re-written with the road classification information 201 designating the national road. On the other hand, the control unit 20 reads the flag information 202 recorded in the empty area 114*c* of the node data 110*c*-1 obtained by updating the node data 110*c,* and then recognizes that data storing the node to be accessed next to the node #3 is changed from the updated data 300 to a difference update data 400. That is, the control unit 20 recognizes that the node to be accessed next is not in the updated data 300, but in the difference update data 400 that may be stored in the CD-ROM 33, the DVD-ROM 34 or the hard disk 36. Then, the control unit 20 reads the address information 203, which is recorded at the jump address 111*c* of the node data 110*c*-1. The jump address (i.e., the address to be jumped) designated by the address information 203 is for designating an address of the node #4 and for recognizing that the data storing the node to be accessed next is included in the difference update data 400, through reading the above-mentioned flag information. For this reason, the control unit 20 accesses the difference update data 400 to read the node data 110*d* designating the node #4 and the link data 120*d* designating the link #4, and store them into the RAM 24.

As shown in the lower section of FIG. 7, the difference update data 400 includes the node data 110*d* designating the node #4 and the link data 120*d* designating the link #4. The jump address 401 of the node data 110*d* designates the address of the node #1. Thereby, the control unit 20 accesses the node #1 next to the node #4. Here, an association among the jump addresses of each node forms a loop, thereby the control unit 20 recognizes that the node #1, the node #2, the node #3 and the node #4 forms one intersection. That is, similar to the navigation processing using the original data 100 only, a normal navigation processing is possible, with using the difference update data 400.

Incidentally, the jump address 401 of the difference update data 400 is for directing the destination to each other among multiple difference update data, by recording, into the difference update data 400, jump data ID information, flag information or the like to indicate whether the jump address in the difference update data 400 directs the updated data 300 or another difference update data 400.

As a result, even if the road is added or the information about the road is changed, it is possible for the navigation apparatus to perform the navigation processing using the map data in which the new information is reflected, without changing the structure of the original data 100. Further, it is possible for the navigation apparatus to perform the navigation processing efficiently only with an access to a necessary part of the difference update data 400, by changing the jump address 111 (or 121) of the original data 100 and by recording the flag information into the empty area 114 (or 124).

Incidentally, in the above embodiment, the merge data 200 or the difference update data 400 is stored in the CD-ROM 33, the DVD-ROM 34 or the hard disk 36. Nevertheless, these data may be stored in various information record media. For example, they may be stored in a re-writable information record medium, such as a CD-RW, a DVD-RW or the like. Alternatively, they may be stored in a removable-type information record medium, such as a memory card, a memory stick or the like. Alternatively, these data may be received at the communication device 38, for example via Internet.

On the other hand, the updated data 300 may be stored into the hard disk 36, after the navigation processing on the RAM 24. Alternatively, the updated data 300 may be generated altogether for the entire merge data 200. Alternatively, the updated data 300, which is generated for each processing unit of the navigation apparatus, may be stored into the hard disk 36 and used in the navigation processing later.

Incidentally, as in the above embodiment, by using not only the flag information to indicate that the data to be accessed next is included in the difference update data 400, but also altering the computer program used for the navigation apparatus or modifying the design of the control unit 20, it is possible to give new meaning to the empty area 114 (or 124) and thereby propose various additional functions.

(Specific Operations of the Navigation Apparatus)

Next, with reference to flow charts of FIG. 8 to FIG. 12, an operation in the embodiment of the navigation apparatus according to the present invention will be discussed, on a case-by-case basis. Herein FIG. 8 to FIG. 12 are flow charts illustrating the operation of the navigation apparatus.

(1) A Case that the Merge Data and the Difference Update Data are Included in a Information Record Medium.

This case will now be discussed, with reference to FIG. 8 and FIG. 9.

Figure 8:
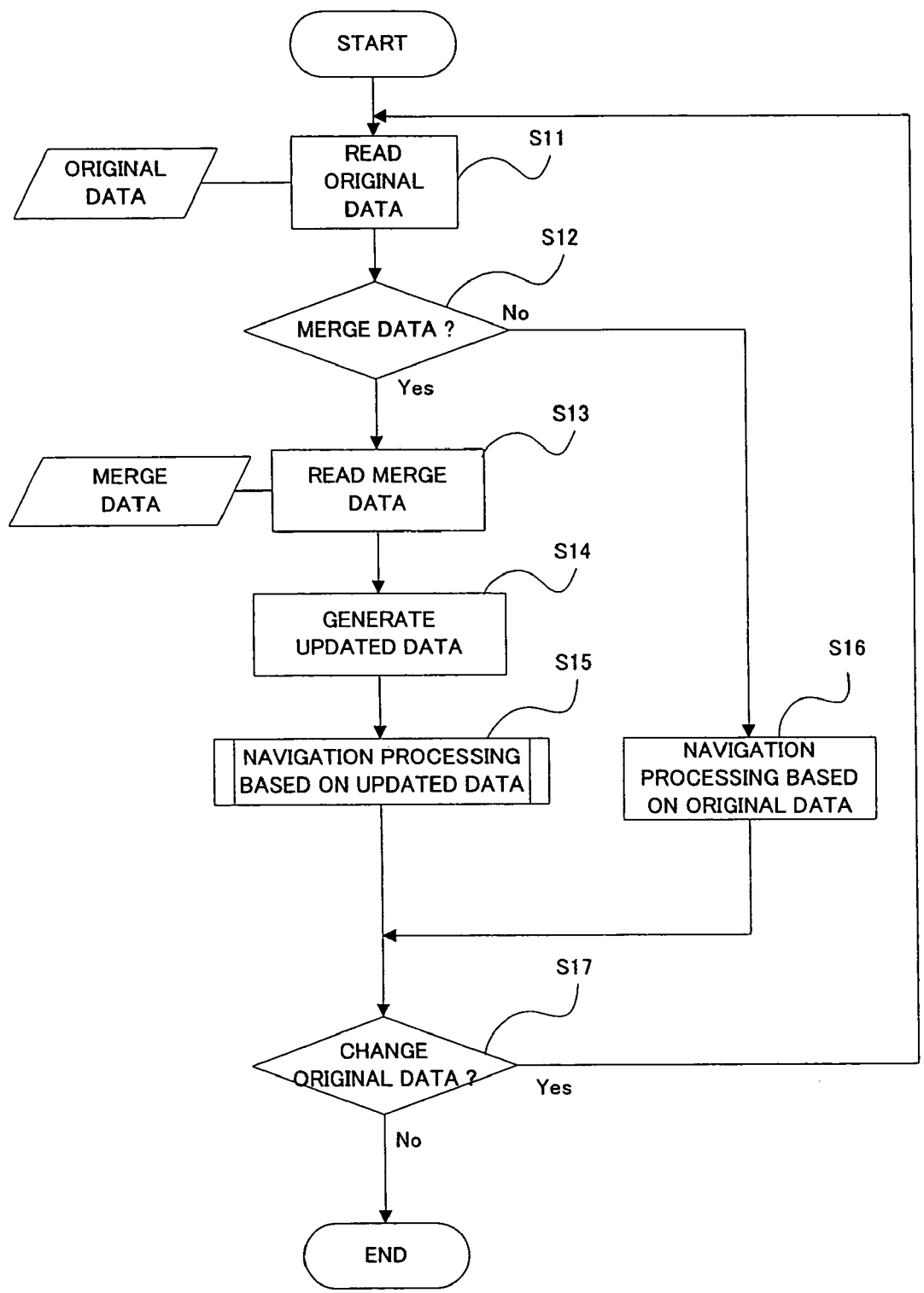
FIG. 8 is a flow chart illustrating an operation of the navigation processing of the navigation apparatus according to the embodiment of the present invention.

As shown in FIG. 8, on the operation of the navigation apparatus according to the present invention, firstly, the control unit 20 (i.e. CPU 22) reads the original data 100 including the map data, which is stored in the CD-ROM 33, the DVD-ROM 34 or the hard disk 36, in a parcel unit, in accordance with a current position, which may be determined in a GPS measurement, and store it in the RAM 24 (step S11). Next, it judges whether the merge data 200 corresponding to the original data 100 already read exists or not, on the basis of the above-mentioned label information or the like (step S12).

If the corresponding merge data 200 does not exist (step S12: NO), the navigation processing such as a route searching is proceeded under control of the CPU 22, on the basis of the original data already read (step S16). That is, using only the node data 110 and the link data 120 which are included in the original data 100, the navigation processing is proceeded on the parcel unit of the original data 100 that is read at the step S11. After completion of the navigation processing on the parcel unit, the process goes to the step S17.

On the other hand, if the corresponding merge data 200 exists (step S12: YES), the control unit 20 reads a part of the merge data 200, the part being stored in the CD-ROM 33, the DVD-ROM 34 or the hard disk 36 and corresponding to the original data 100 that is read at the step S11, and stores it into the RAM 24 (step S13). After that, the control unit 20 writes the merge data 200 onto the original data 100 read at the step S11, so that updated data 300 is newly generated and stored into the RAM 24 (step S14).

After that, as mentioned below, the navigation processing is proceeded on the basis of the updated data (step S15). Then, it is judged whether or not another parcel unit of the original data 100 different from the parcel unit of the original data 100 that is read at the step S11 is to be read (step S17). If another parcel unit of the original data 100 is to be read (step S17: YES), the control unit 20 reads again said another parcel unit of the original data 100 (step S11). If another parcel unit of the original data 100 is not to be read (step S17: NO), the navigation processing is terminated in its operation.

Next, with reference to a flow chart of FIG. 9, the navigation processing to be performed on the basis of the updated data (step S15) will be discussed.

Figure 9:
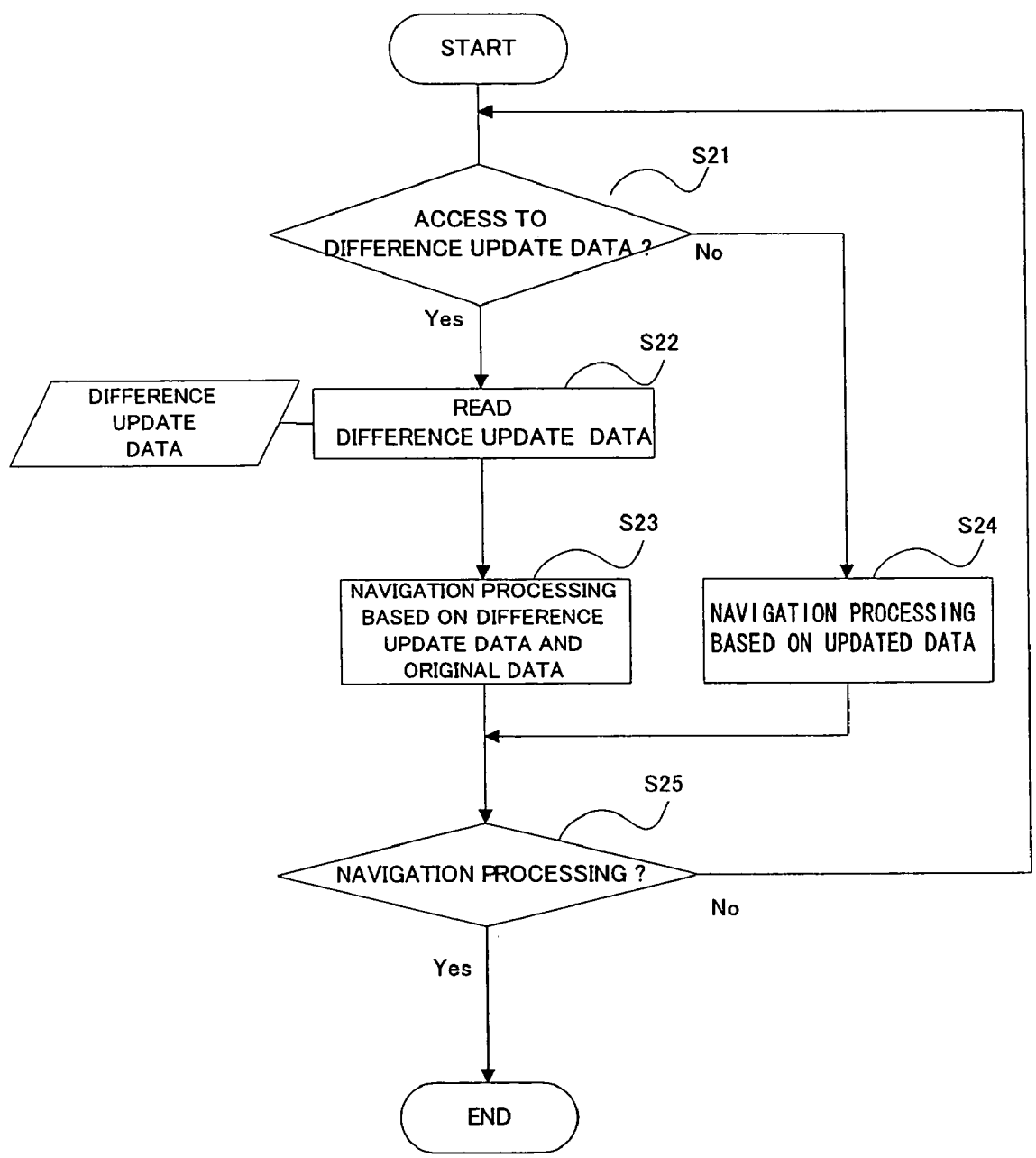
FIG. 9 is a flow chart illustrating another operation of the navigation processing of the navigation apparatus according to the embodiment of the present invention.

For example, as shown in FIG. 9, the flag information, which is included in the updated data 300 generated at the step S14 (See FIG. 8) and is to be recorded into the predetermined empty area 114 (or 124) of the original data 100, is read for a judgement whether or not the data storing the node or link that the CPU 22 accesses next in the navigation processing is included in the difference update data 400 (step S21).

If the data storing the node or link that the CPU 22 accesses next is not included in the difference update data 400 (step S21: NO), the navigation processing such as a route searching is proceeded (step S24), under control of the CPU 22, on the basis of the updated data 300 generated at the step S14 (See FIG. 8). That is, only with the node data 110 or link data 120 included in the updated data 300, the navigation processing is proceeded. Then, the process goes to the step S25.

On the other hand, if the data storing the node or link that the CPU accesses next is included in the difference update data 400 (step S21: YES), among from the difference update data 400 stored in the CD-ROM 33, the DVD-ROM 34 or the hard disk 36, the node data 110 or link data 120 to be accessed next is read and stored into the RAM 24 (step S22). Then, the navigation processing is proceeded (step S23), under control of the CPU 22, on the basis of the updated data 300 generated at the step S14 (See FIG. 8) and the node data 110 or link data 120 in the difference update data 400 that is read at the step S22. That is, with node data 110 or link data 120 included in the updated data 300, and node data 110 or link data 120 included in the difference update data 400, the navigation processing is proceeded.

Then, it is judged whether or not the node or link to be accessed next in the navigation processing exists, i.e. whether or not the navigation processing such as the rout searching is to be terminated (step S25). If the navigation processing is to be continued, i.e. if another node or link is to be accessed again (step S25: YES), it is judged again whether or not the node or link to be accessed next is included in the difference update data 400, on the basis of the updated data 300 (step S21). On the other hand, if the navigation processing is to be terminated, i.e. if the processing by the parcel unit of the original data 100 that is read at the step S11 (See FIG. 8) is to be terminated (step S25: YES), the navigation processing is to be terminated, and it is judged whether or not another parcel unit of the original data 100 is to be read (step S17) (See FIG. 8).

(2) A Case that the Merge Data and the Difference Update Data are Received Via the Communication Network.

This case will be discussed, with reference to FIG. 10 and FIG. 11. Incidentally, in FIG. 10 and FIG. 11, the same steps as those in FIG. 8 and FIG. 9 carry the same reference numerals, and the explanations thereof are omitted.

Figure 10:
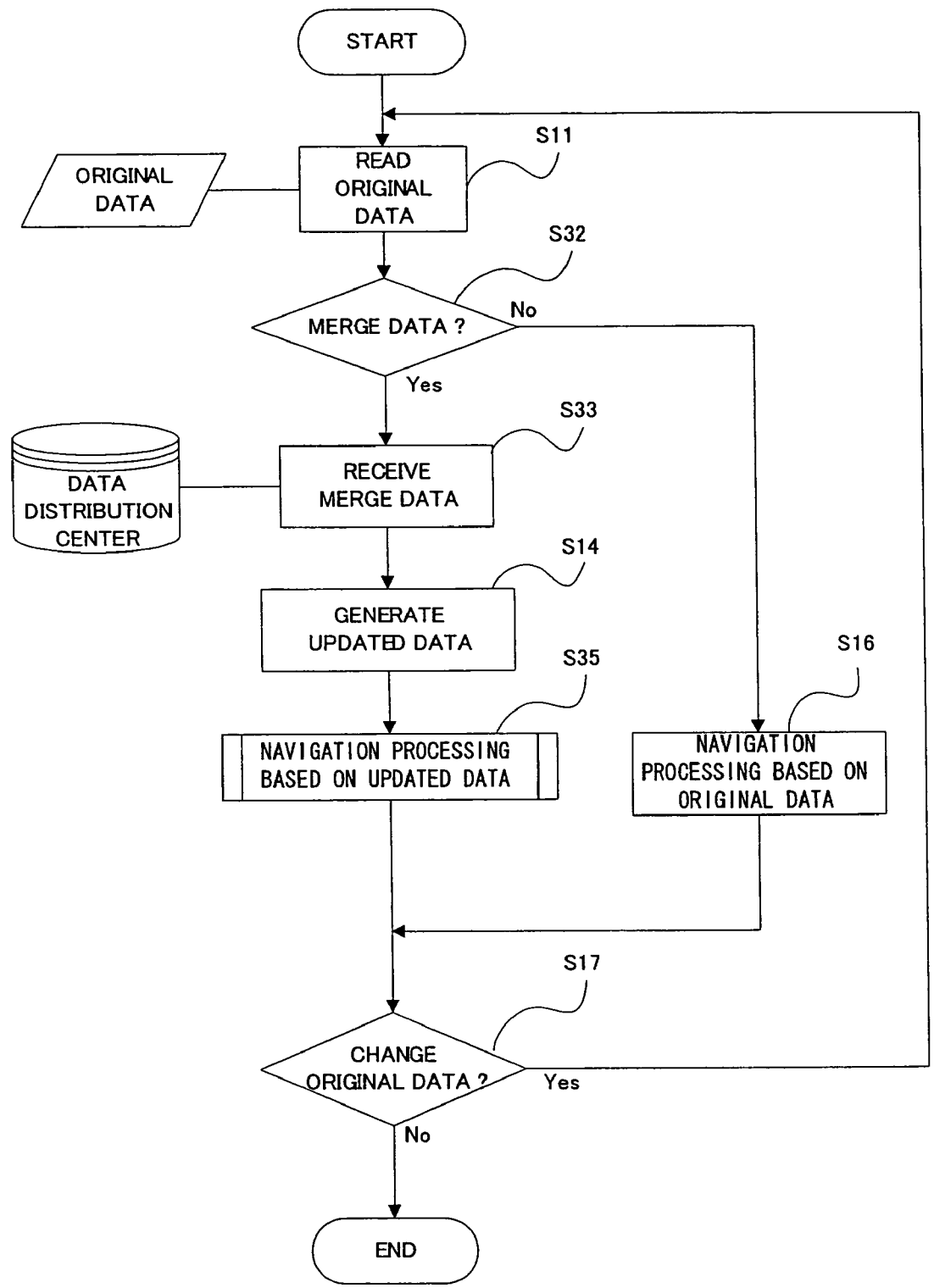
FIG. 10 is a flow chart illustrating another operation of the navigation processing of the navigation apparatus according to the embodiment of the present invention.

As shown in FIG. 10, on operation of the navigation apparatus according to the embodiment of the present invention employing a scheme of receiving the merge data and the difference update data via the communication network, firstly, the original data 100 is read (step S11). Next, it is judged whether or not the merge data 200 corresponding to the original data already read exists (step S32). In this case, for example, ID information for the original data 100 already read may be transmitted to the data distribution center or the like through the communication device 38 via the communication network such as Internet, for a judgement at the data distribution center about whether or not the merge data 200 corresponding to the original data 100 exists.

If the data distribution center makes a response as a result of the judgement indicating nonexistence of the merge data 200 corresponding to the original data (step S32: NO), the navigation processing is proceeded on the basis of the original data 100 (step S16). Then, the process goes to the step S17.

If the data distribution center makes a response as a result of the judgement indicating existence of the merge data 200 corresponding to the original data (step S32: YES), a distribution request or the like is transmitted to the data distribution center, and the merge data 200 as required is received and stored into the RAM 24 (step S33), through the communication device 38, via the communication network. Relating to this, the merge data 200 as required may be received at the same time of receiving the response from the distribution center indicating the existence of the merge data 200 corresponding to the original data 100. Then, the received merge data 200 is recorded into the read original data 100 to generate a new updated data 300 and store it into the RAM 24 (step S14). Then, as mentioned below, the navigation processing is proceeded, on the basis of the updated data generated at the step S14 (step S35).

Then, it is judged whether or not another parcel unit of the original data 100 is to be read (step S17), and the parcel unit of the original data is read (step S11). Alternatively, the navigation apparatus is terminated.

Next, with reference to a flow chart of FIG. 11, the navigation processing to be performed on the basis of the updated data (step S35) will be discussed.

Figure 11:
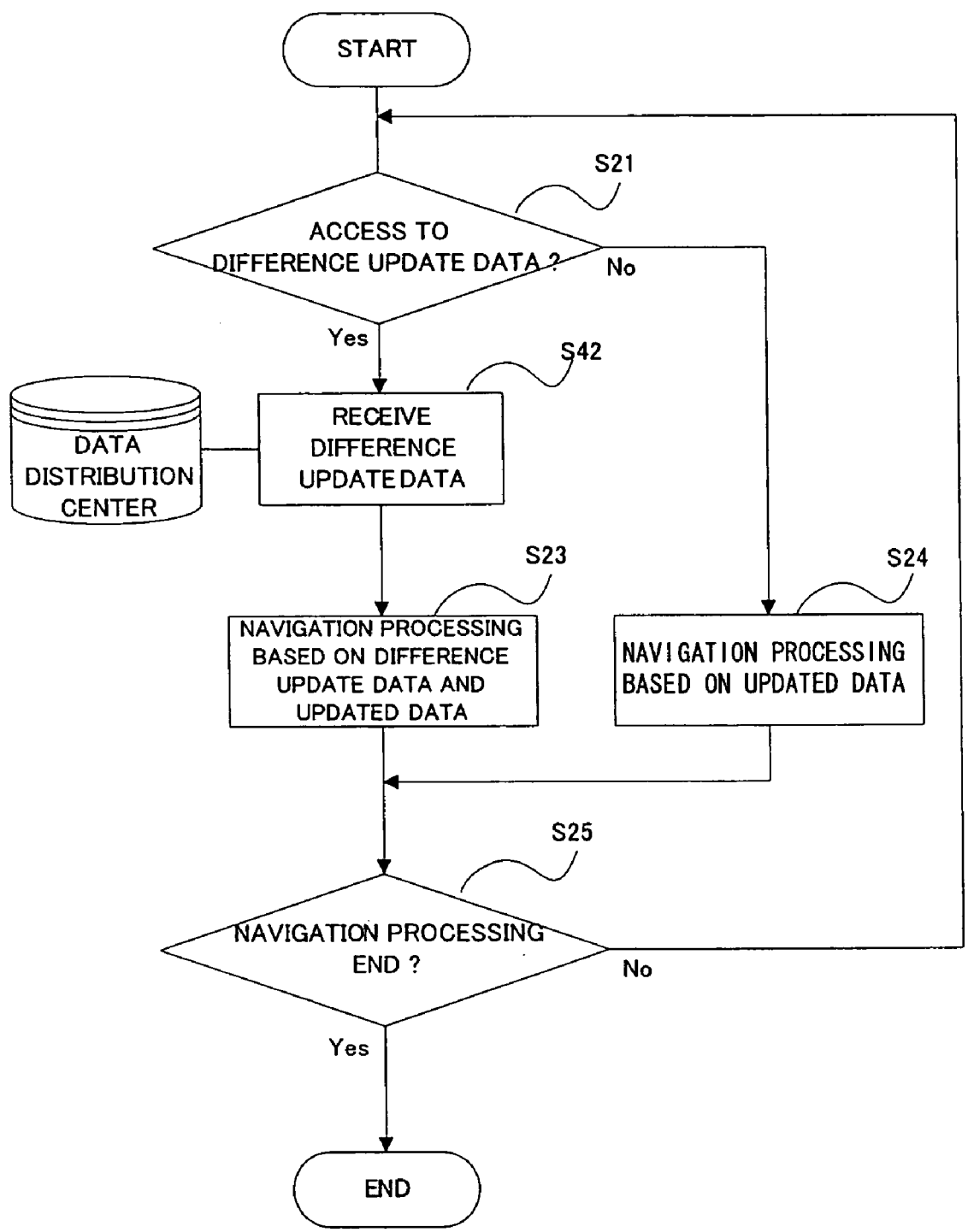
FIG. 11 is a flow chart illustrating another operation of the navigation processing of the navigation apparatus according to the embodiment of the present invention.

As shown in FIG. 11, it is judged whether or not the data storing the node or link to be accessed next is included in the difference update data 400 (step S21).

If the data storing the node or link to be accessed next is not included in the difference update data 400 (step S21: NO), the navigation processing is proceeded (step S24), on the basis of the updated data 300 that is generated at the step S14 (See FIG. 10). Then, the process goes to the step S25.

On the other hand, if the data storing the node or link to be accessed next is included in the difference update data 400 (step S21: YES), a distribution request may be transmitted to for example the data distribution center or the like so as to distribute for example the node data 110 or link data 120 to be accessed in the difference update data 400, through the communication device 38 via the communication network. As a response to this, the difference update data 400 as required is received and stored into the RAM 24 (step S42). Then, the navigation processing is proceeded (step S23), on the basis of the node data 110 and the link data 120 in the difference update data 400 received at the step S42 and the updated data 300 generated at the step S14 (See FIG. 10).

Then, it is judged whether or not the navigation processing is to be terminated (step S25). If the navigation processing is to be continued (step S25: YES), it is judged again whether or not the node or link to be accessed next is included in the difference update data 400 (step S21). If the navigation processing is to be terminated (step S25: NO), the navigation processing is terminated and it is judged whether or not another parcel unit of the original data is to be read (step S17) (See FIG. 10).

As mentioned above, owing to a construction of receiving the merge data 200 and the difference update data 400 via the communication network, the amount of data to be processed in the navigation apparatus according to the present invention can be reduced, with only receiving the merge data 200 or the difference update data 400 required for the navigation processing. That is, a navigation apparatus improved in its performance speed or its efficiency can be implemented.

Incidentally, as mentioned above, the merge data or the difference update data may be received in advance and stored into the hard disk 36 or the like, instead of receiving the merge data or the difference update data at every navigation processing. In this case, the navigation processing may be proceeded, in accordance with the exemplary operation shown in FIG. 8 and FIG. 9.

(3) A Case that the Updated Data Already Generated is Re-Used.

This case will be discussed, with reference to FIG. 12. Incidentally, in FIG. 12, the same steps as those shown in FIG. 8 and FIG. 9 carry the same reference numerals, and the explanations thereof are omitted.

Figure 12:
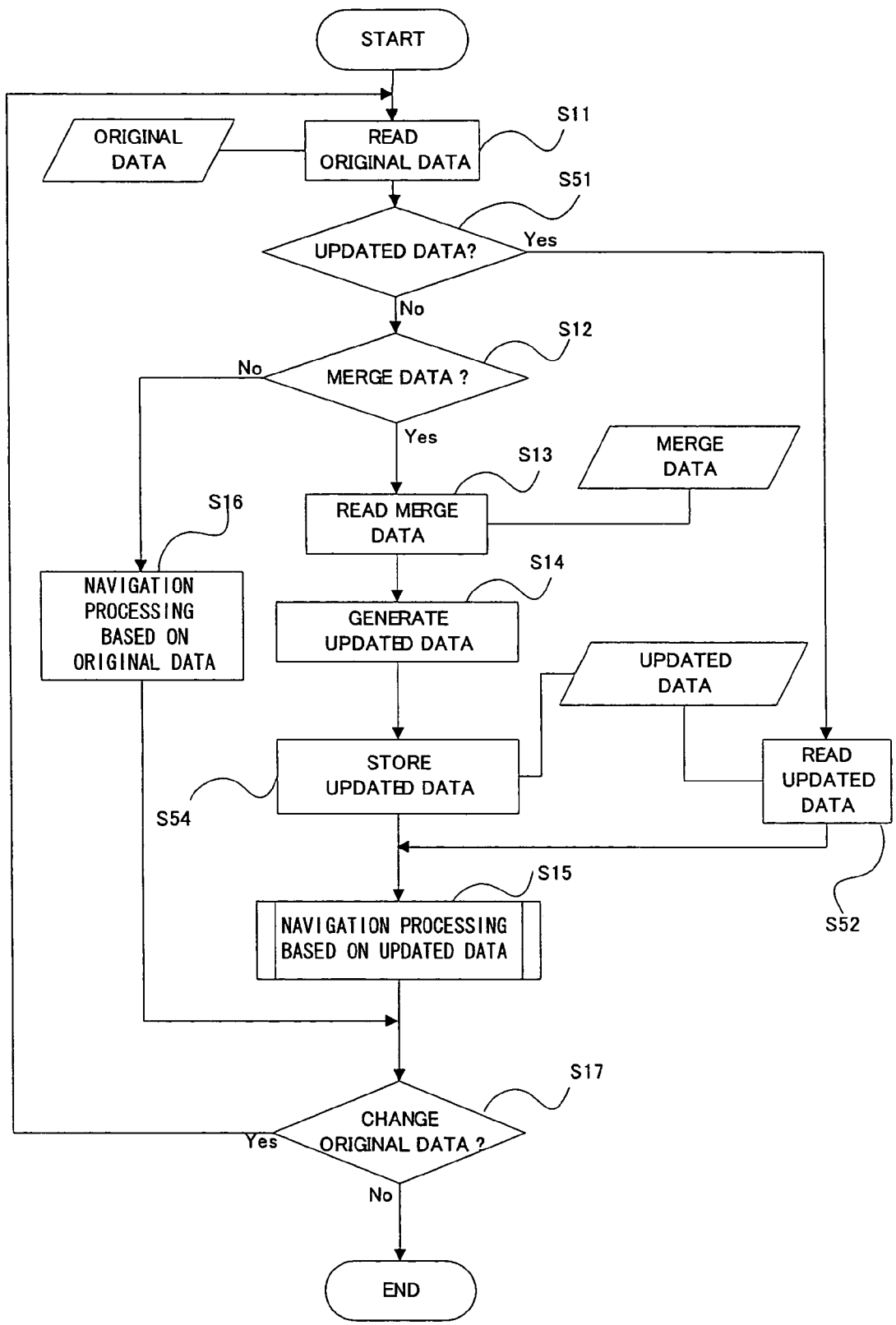
FIG. 12 is a flow chart illustrating another operation of the navigation processing of the navigation apparatus according to the embodiment of the present invention.

As shown in FIG. 12, on operation of the navigation apparatus according to the present invention employing a scheme of re-using the updated data already generated, firstly, the original data 100 is read (step S11). Next, it is judged whether or not the updated data 300 corresponding to the original data 100 already read exists (step S51). In this case, for example, the judgement may be performed with the ID information of the original data 100 already read (e.g. a node ID number, a link ID number or the like), and the ID information of the original data included in the updated data 300.

If the corresponding updated data 300 exists (step S51: YES), i.e. if the original data 100 for which the updated data 300 is already generated is read, the updated data 300 stored in the hard disk 36 is read and stored into the RAM 24 (step S52). Then, the navigation processing is proceeded (step S15), on the basis of the updated data 300.

On the other hand, if the updated data 300 corresponding to the original data 100 already read at the step S11 does not exist (step S51: NO), it is judged whether or not the merge data 200 corresponding to the original data 100 exists (step S12).

If the corresponding merge data 200 does not exist (step S12: NO), the navigation processing is proceeded (step S16), on the basis of the original data 100 already read at the step S11. Then, the process goes to the step S17.

On the other hand, if the corresponding merge data 200 exists (step S12: YES), the merge data 200 is read (step S13) to generate the updated data 300 (step S14). Then, the updated data 300 generated at the step S14 is stored into the hard disk 36 for re-use in the later navigation processing (step S54). Then, the navigation processing is proceeded on the basis of the updated data (step S15).

After the navigation processing is terminated, it is judged whether or not another parcel unit of original data 100 is to be read (step S17), and the parcel unit of original data 100 is read again (step S11). Alternatively, the navigation apparatus is terminated in its operation.

As mentioned above, re-using the updated data 300 eliminates a necessity for the control unit 20 to generate the updated data 300 repeatedly. Thereby, the duty on the control unit 20 is alleviated and hence the navigation apparatus according to the present invention can be improved in its performance speed.

Furthermore, the navigation apparatus according to the present invention is not limited to the on-vehicle use disclosed in the above-mentioned embodiments, but also applicable to various navigation apparatuses including a use for various mobile bodies such as aircraft, shipping, two-wheeler etc. or to a use for a pedestrian or animal equipped with a PDA, a cell phone etc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-368775 filed on Dec. 19, 2002 including the specification, claims, drawings and summary is incorporated herein by reference in its entirety.

What is claimed is:

1. A navigation apparatus comprising:
   a first storing device for storing original data for a navigation based on a predetermined format and including map data, in such a manner that an empty area exists on the predetermined format in each of a plurality of units of processing objects for a predetermined kind of navigation processing, wherein each unit of processing object is a unit of the original data;
   a second storing device for storing difference update data representing a data portion for the navigation that is updated with respect to the original data as a standard;
   a re-writing device for generating updated data based on the format and including the original data and merge data, by re-writing the merge data at least partially into the empty area corresponding to the merge data, the merge data defining a relationship of the difference update data stored in said second storing device with respect to the original data stored in said first storing device for said each unit of processing object; and
   a processing device for (i) making access, for said each unit of processing object, to the original data and the merge data in the updated data, and (ii) if the accessed data is the merge data, then also making access to the difference update data, the relationship of which is defined by the merge data and which is stored in said second storing device, and (iii) performing the navigation processing on the basis of the accessed original data and the accessed difference update data.

2. The navigation apparatus according to claim 1, wherein said re-writing device re-writes a part of the original data with at least a part of the merge data, in addition to or instead of re-writing the merge data at least partially into the empty area.

3. The navigation apparatus according to claim 1, wherein the original data includes, for said each unit of processing object, jump address information indicating an address of one unit of processing object to be accessed next to another one unit of processing object for the navigation processing, and
   said re-writing device writes flag information as a part of the merge data into the empty area, the flag information indicating whether the jump address information is included in the original data or in the difference update data.

4. The navigation apparatus according to claim 3, wherein said re-writing device re-writes the jump address information with at least a part of the merge data.

5. The navigation apparatus according to claim 1, wherein said second storing device stores the merge data as well as the difference update data.

6. The navigation apparatus according to claim 5, wherein said second storing device includes a removal type record medium, in which the difference update data and the merge data are recorded.

7. The navigation apparatus according to claim 1, further comprising a communication device for receiving at least one of the difference update data and the merge data via a communication network, wherein said second storing device stores the difference update data received by said communication device.

8. The navigation apparatus according to claim 1, wherein said first storing device comprises a re-writable type storing device, and stores the updated data instead of or in addition to the original data.

9. The navigation apparatus according to claim 1, further comprising a re-writable type third storing device for storing the updated data, wherein said first storing device is a read-only type storing device.

10. The navigation apparatus according to claim 1, wherein said re-writing device generates the updated data collectively in accordance with a whole of the difference update data and the merge data.

11. The navigation apparatus according to claim 1, wherein said re-writing device generates the updated data partially in accordance with a part of the difference update data and the merge data corresponding to a data range to be used in the navigation processing.

12. The navigation apparatus according to claim 1, wherein the map data includes: node data indicating a node corresponding to a predetermined point in a pre-set road network; and link data indicating a link corresponding to a part of a road between two nodes, and
said each unit of processing object is a unit divided into a node part and a link part.

13. The navigation apparatus according to claim 12, wherein the navigation processing is for making access sequentially to the original data and the difference update data to trace the link connected to the node.

14. The navigation apparatus according to claim 1, wherein the merge data includes data size information indicating data size; and offset information indicating an offset of the difference update data corresponding to the merge data from an address of the original data.

15. The navigation apparatus according to claim 1, wherein, with regard to a part of the original data which is described by a plurality of kinds of codes set in advance, said re-writing device re-writes the code directly in accordance with the merge data.

16. A navigation method in a navigation apparatus comprising: a first storing device for storing original data for a navigation based on a predetermined format and including map data, in such a manner that an empty area exists on the predetermined format in each of a plurality of units of processing objects for a predetermined kind of navigation processing, wherein each unit of processing object is a unit of the original data; and a second storing device for storing difference update data representing a data portion for the navigation that is updated with respect to the original data as a standard, said method comprising:
a re-writing step of generating updated data based on the format and including the original data and merge data, by re-writing the merge data at least partially into the empty area corresponding to the merge data, the merge data defining a relationship of the difference update data stored in said second storing device with respect to the original data stored in said first storing device for said each unit of processing object; and
a processing step of (i) making access, for said each unit of processing object, to the original data and the merge data in the updated data, and (ii) if the accessed data is the merge data, then also making access to the difference update data, the relationship of which is defined by the merge data and which is stored in said second storing device, and (iii) performing the navigation processing on the basis of the accessed original data and the accessed difference update data.

17. A computer program product in a computer-readable medium for tangibly embodying a program of instructions executable by a computer to make the computer function as at least a part of a navigation apparatus, said navigation apparatus comprising:
a first storing device for storing original data for a navigation based on a predetermined format and including map data, in such a manner that an empty area exists on the predetermined format in each of a plurality of units of processing objects for a predetermined kind of navigation processing, wherein each unit of processing object is a unit of the original data;
a second storing device for storing difference update data representing a data portion for the navigation that is updated with respect to the original data as a standard;
a re-writing device for generating updated data based on the format and including the original data and merge data, by re-writing the merge data at least partially into the empty area corresponding to the merge data, the merge data defining a relationship of the difference update data stored in said second storing device with respect to the original data stored in said first storing device for said each unit of processing object; and
a processing device for (i) making access, for said each unit of processing object, to the original data and the merge data in the updated data, and (ii) if the accessed data is the merge data, then also making access to the difference update data, the relationship of which is defined by the merge data and which is stored in said second storing device, and (iii) performing the navigation processing on the basis of the accessed original data and the accessed difference update data.

18. A navigation apparatus comprising:
a first storing device which stores original data for a navigation based on a predetermined format and which includes map data, wherein an empty area exists on the predetermined format in each of a plurality of units of processing objects for a predetermined kind of navigation processing, wherein each unit of processing object is a unit of the original data;
a second storing device which stores difference update data representing a data portion for the navigation that is updated with respect to the original data;
a re-writing device which generates updated data based on the format and which includes the original data and merge data, the re-writing device generating the updated data by re-writing the merge data into the empty area corresponding to the merge data, the merge data defining a relationship of the difference update data stored in said second storing device with respect to the original data stored in said first storing device for said each unit of processing object; and
a processing device which makes access to the original data and the merge data in the updated data for said each unit of processing object, makes access to the difference update data if the accessed data is the merge data, the difference update data being stored in said second storing device and the relationship of the difference update data being defined by the merge data, and performs the navigation processing on the basis of the accessed original data and the accessed difference update data.

19. The navigation apparatus according to claim 1, wherein the plurality of units of processing objects comprise node units of the original data.

20. The navigation apparatus according to claim 1, wherein the plurality of units of processing objects comprise link units of the original data.

21. The navigation apparatus according to claim 1, wherein the plurality of units of processing objects comprise parcel units of the original data.

* * * * *